Dec. 30, 1952 W. B. HURLBURT 2,623,661
DISTRIBUTOR FOR PARTICULATE MATERIAL
Filed May 12, 1949 4 Sheets-Sheet 1
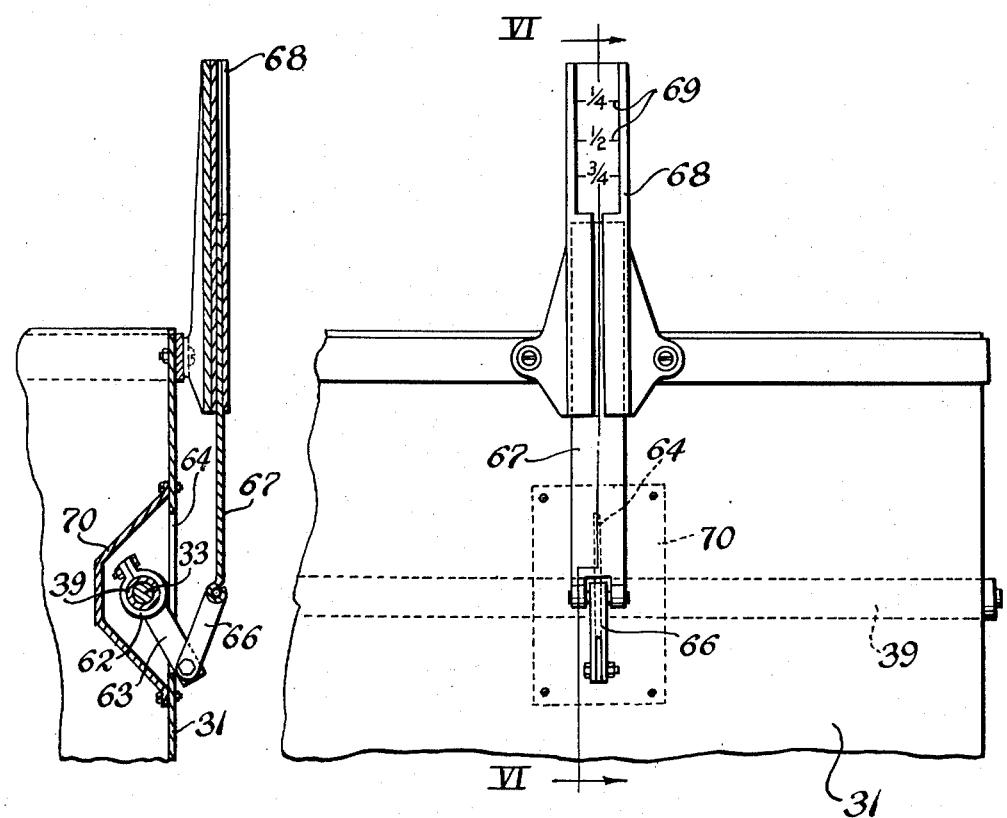
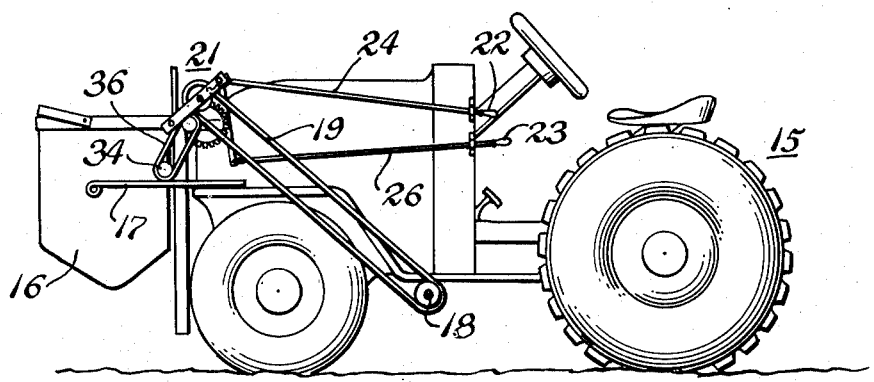
INVENTOR.
WALLACE B. HURLBURT
BY Zugelter & Zugelter
Attys.

Dec. 30, 1952 W. B. HURLBURT 2,623,661
DISTRIBUTOR FOR PARTICULATE MATERIAL
Filed May 12, 1949 4 Sheets-Sheet 2

INVENTOR.
WALLACE B. HURLBURT
BY Zugelter & Zugelter
Attys.

Dec. 30, 1952 W. B. HURLBURT 2,623,661
DISTRIBUTOR FOR PARTICULATE MATERIAL
Filed May 12, 1949 4 Sheets-Sheet 4
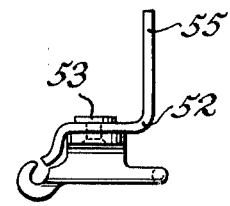
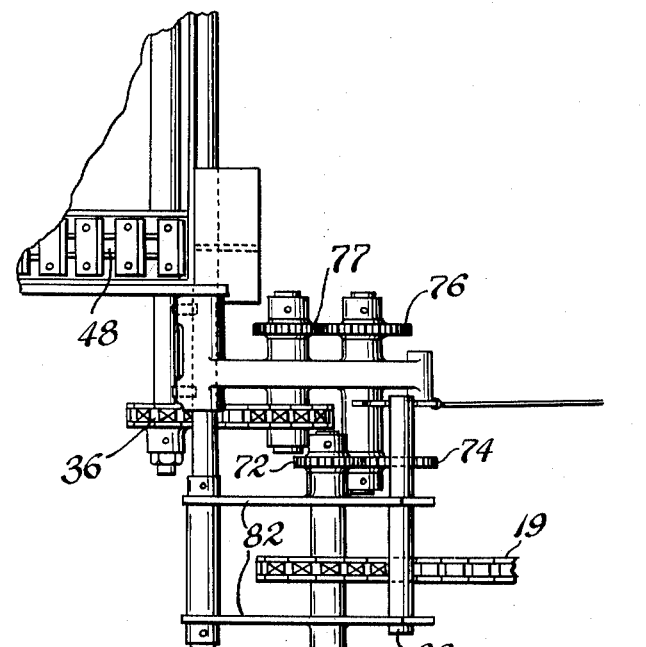
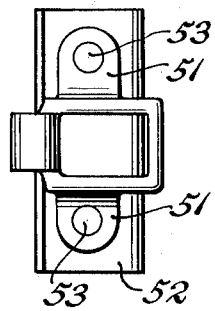
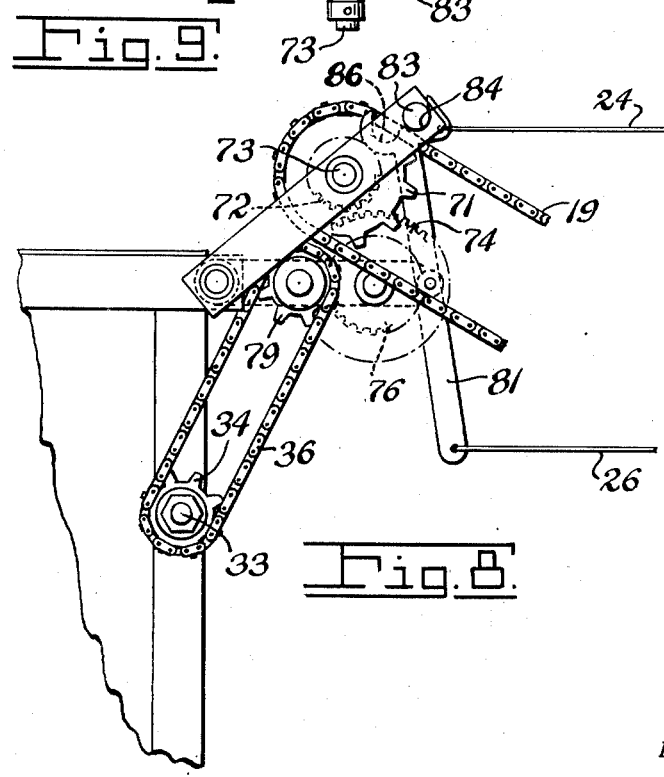
INVENTOR.
WALLACE B. HURLBURT
BY
Zugelter & Zugelter
Attys.

Patented Dec. 30, 1952

2,623,661

UNITED STATES PATENT OFFICE 2,623,661

DISTRIBUTOR FOR PARTICULATE MATERIAL

Wallace B. Hurlburt, Cincinnati, Ohio

Application May 12, 1949, Serial No. 92,848

6 Claims. (Cl. 222—405)

This invention relates to a device for distributing seed, fertilizer or other particulate material from a hopper.

An object of this invention is to provide a device which may be mounted on or operatively attached or coupled to an agricultural tractor and utilized to distribute particulate material such as seed or fertilizer concurrently while cultivating or plowing is being done by the tractor.

A further object of this invention is to provide a device for distributing particulate material which automatically takes from the top of material in a hopper and delivers the material in a continuous and uniform flow.

A further object of this invention is to provide a distributor in which the danger of bridging or arch formation of material over the distributor is minimized.

A further object of this invention is to provide a distributor which can be mounted on and carried at the front of a tractor or the like to distribute particulate material in advance of the tractor and tools dragged by the tractor.

A further object of this invention is to provide a distributing device which automatically breaks up any enlarged particles caused by adhesion of smaller particles to one another.

A further object of this invention is to provide a device which automatically and continuously takes material in a hopper at a uniform rate from the top of the material where the weight of material bearing on the particles from above is a minimum and since the force required to separate and distribute particles is a minimum, the danger of bruising seeds or other fragile material is reduced.

A further object of this invention is to provide a device by means of which seeds and fertilizer may be distributed either together or separately.

A further object of this invention is to provide a distributor capable of handling seeds of various sizes from the very smallest to seeds the size of lima beans and larger in a continuous and uniform flow at a predetermined and controllable rate.

A still further object of this invention is to provide a distributor adapted to handle fertilizer in which there are no moving parts that are covered by the fertilizer so that if fertilizer is left in the hopper it cannot form a solid bridge over or about moving parts that is likely to lead to the distributor being damaged.

The above and other objects and features of the invention will in part be apparent and will in part be obvious from the following detailed description and the drawings, in which;

Figure 1 is a view in side elevation showing a tractor equipped with a hopper and distributing device constructed in accordance with an embodiment of this invention;

Fig. 5 is a fragmentary view in elevation of the rear of the hopper showing details of an indicator which records the depth of material in the hopper;

Fig. 6 is a view in section taken along a line VI—VI in Fig. 5;

Fig. 8 is a fragmentary view in side elevation showing details of a gear drive and clutch mechanism for driving the distributor;

Fig. 9 is a plan view of the gear and clutch mechanism shown in Fig. 8;

Fig. 10 is a view in side elevation showing a link of a chain which forms a portion of the distributor; and Fig. 11 is a plan view of the link shown in Fig. 10.

In the following detailed description and the drawing, like reference characters indicate like parts.

Figure 2:
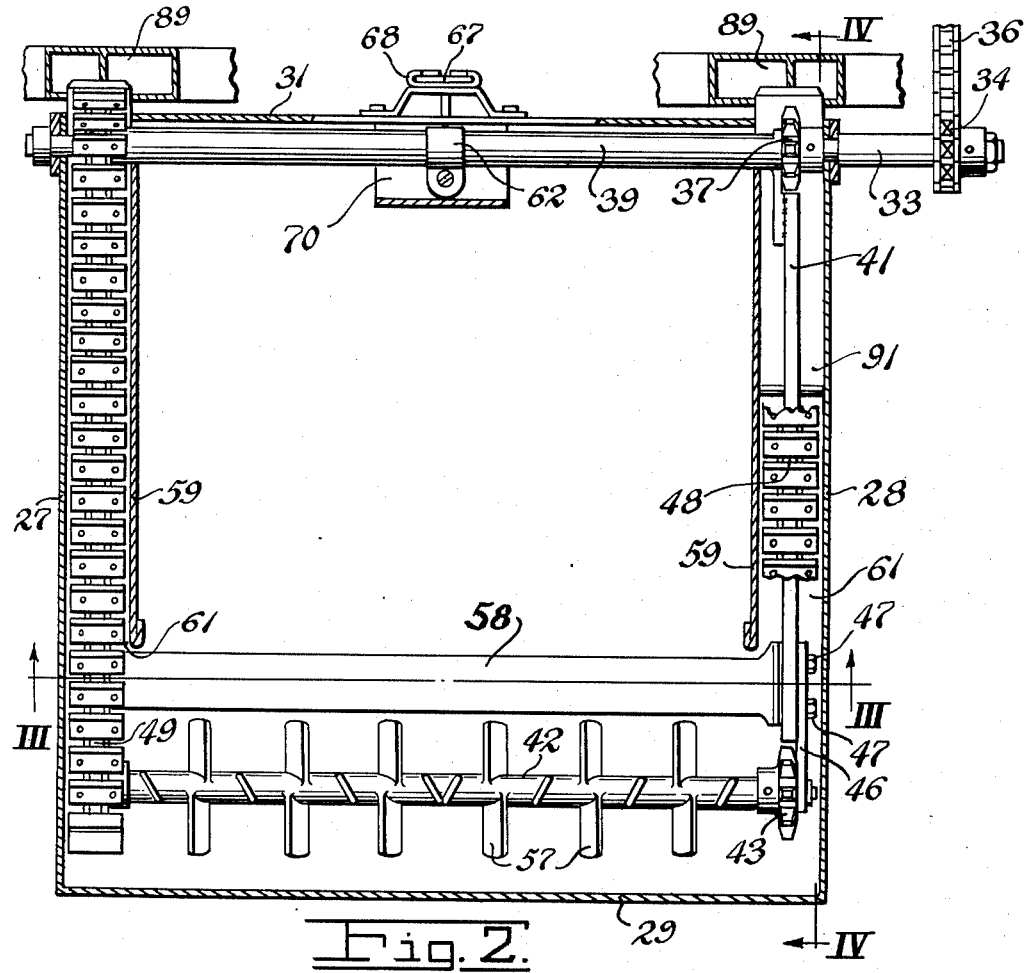
Fig. 2 is a view in horizontal section of the hopper and distributor illustrated in Fig. 1.

In Fig. 1 a tractor, indicated generally at 15, is shown equipped with a distributor 16 embodying a form of the invention. The distributor is supported by appropriate support rods 17, only one of which is shown, which are fixed to the front of the tractor.

Power for operating the distributor 16 is provided by a power take-off pulley 18 appropriately mounted on the tractor 15. The power take-off may preferably be of the type which turns as the tractor advances, the speed of the power take-off being proportional to the ground speed of the tractor. A chain drive 19 or the like extends from the power take-off to gearing and clutch mechanism indicated generally at 21, which will be described in greater detail hereinafter. The clutch mechanism is provided for engaging and disengaging the gears to start and stop the distributor, and handles 22 and 23 at the driver's seat of the tractor may be provided for operating the clutch mechanism. As shown, lines 24 and 26 connect handles 22 and 23 respectively with the gearing and clutch mechanism 21.

Figure 4:
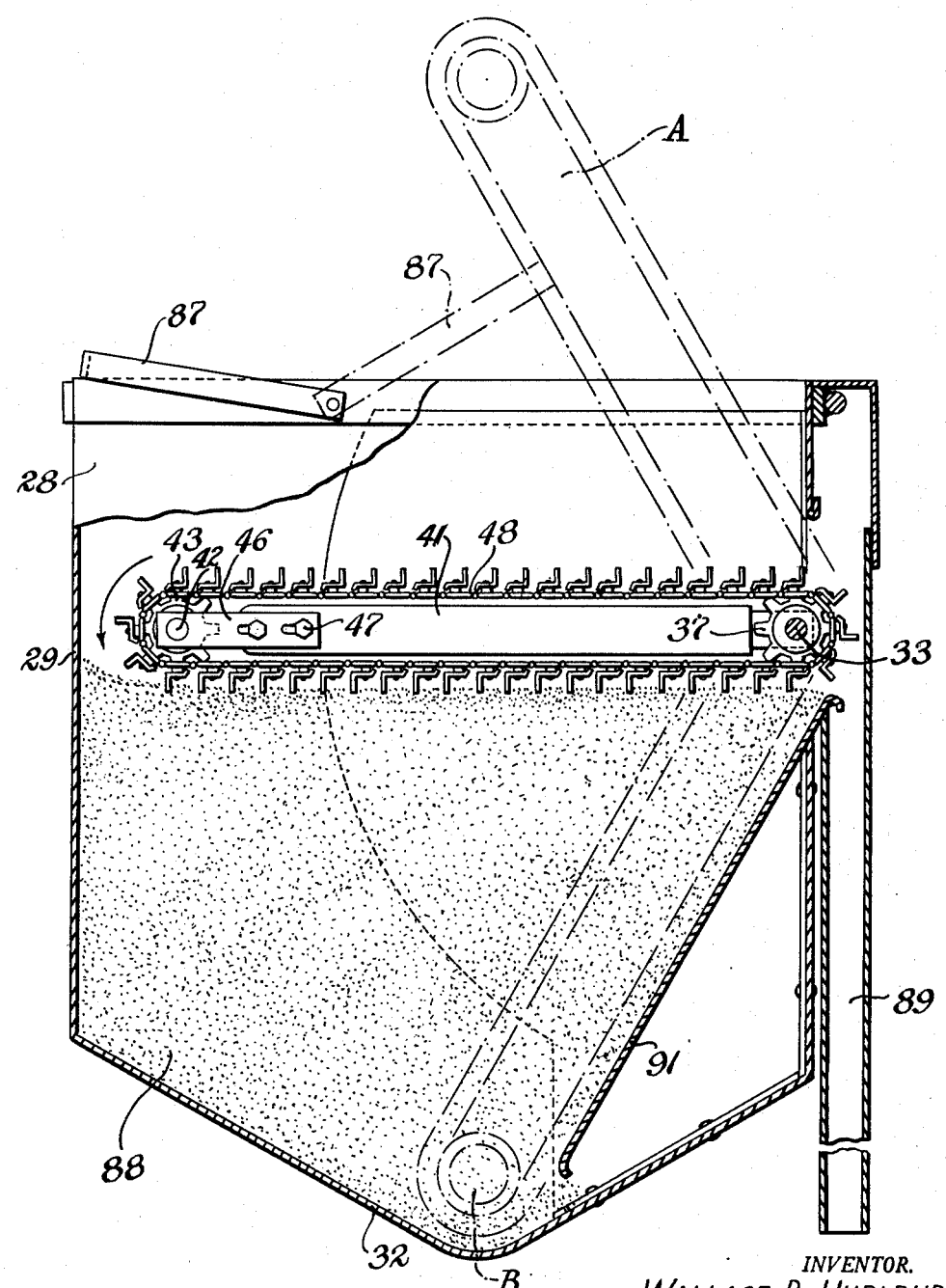
Fig. 4 is a view in section taken along a line IV—IV in Fig. 2, a portion of the hopper being shown in elevation.

Details of construction of the distributor 16 are shown most clearly in Figs. 2 and 4. The distributor 16 includes a hopper having side walls 27 and 28, a front wall 29, a rear wall 31, and a V-shaped bottom 32. A horizontal shaft 33 is rotatably mounted in journals attached to the side walls of the hopper. The shaft 33 is parallel to and adjacent the rear wall 31 and spaced above the V-shaped bottom. The shaft is driven by means of a sprocket wheel 34 mounted thereon outside the hopper. A chain 36 extends from the sprocket wheel to the gearing 21, the chain 36 and sprocket wheel 34 being in mesh to drive the shaft 33.

The shaft 33 carries a pair of sprocket wheels 37, only one of which is shown, each of which is closely spaced from one of the side walls. A sleeve 39 is mounted about the shaft 33 extending between sprocket wheels 37 and is rotatable about the shaft 33. The sleeve 39 serves to carry radial bars 41. Bars 41 are parallel to the side walls of the hopper and extend from sleeve 39 towards the front of the hopper terminating short of the front wall thereof. The front ends of bars 41 carry an impeller shaft 42 having sprocket wheels 43 which drive the impeller shaft. The impeller shaft may be mounted directly on the ends of the bars 41 or as shown in gusset or journal plates 46 which are bolted with bolts 47 or otherwise secured to the bars.

The sprocket wheels 43 and 37 are so disposed that there is an aligned pair adjacent each side of the hopper over which endless chains 48 and 49 run.

Each chain is made up of a series of detachable links similar to the link shown in Figs. 10 and 11. The sides of each link are provided with lugs 51 to which an angle-shaped scraper 52 is attached by means of rivets 53. The portion 55 of the scraper extends at right angles to the chain, and scrapes the material in the hopper when positioned in the lower reaches of the chains.

The impeller shaft 42 is equipped with a plurality of impeller blades 57 which are adapted to distribute material in opposite directions from the central portion of the hopper toward the chains at the sides of the hopper. Thus as the lower reaches of the chains are advanced toward the rear wall of the hopper, the impeller supplies particulate material from the space in the hopper between the chains, so that the chains can advance the material toward the rear wall of the hopper as the shafts are turned.

Figure 3:
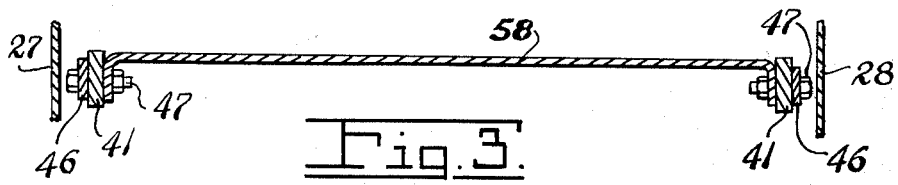
Fig. 3 is a view in section taken along a line III—III in Fig. 2.
Figure 7:
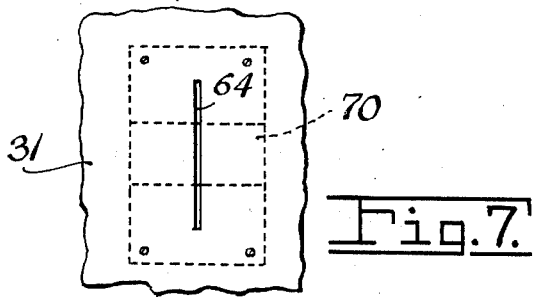
Fig. 7 is a fragmentary view in elevation of the rear wall of the hopper with the indicator removed.

If the material handled by the distributor is of fairly heavy consistency, the distributor is automatically maintained at the top of material in the hopper, but where lightweight material such as seeds are distributed, it may be desirable to include a flat retarder bar 58 (Figs. 2 and 3) which rests on top of material in the hopper and prevents the impeller shaft and chains from falling below the surface of material in the hopper. The retarder bar is attached to the gussets or plates 46 and radial bars 41 by the bolts 47.

A pair of vertical baffles 59 are provided inside the hopper and spaced from the side walls thereof a slightly greater distance than the width of the conveyor chains and the scrapers carried thereby. The respective baffles and the adjacent side walls provide a constricted path for the conveyor chains and in effect form with the scraper blades 55 buckets which carry material out of the hopper, the baffles preventing escape of the material at the sides of the scraper blades 55. The front edges of the baffles extend approximately to the retarder bar and are curved to permit the retarder bar and impeller shaft to swing past the baffles.

As shown in Figs. 2, 5, 6, and 7, an indicator may be provided to indicate the depth of material in the hopper and to warn when the material must be replenished. The indicator includes a split ring 62 attached to the sleeve 39. A crank arm 63 attached to the split ring 62 extends through a narrow vertical slot 64 in the rear wall of the hopper and, by means of a push rod 66 can raise or lower an indicator panel 67. As shown in Fig. 5, the indicator panel 67 can rise and fall through a vertical sleeve 68 which is attached to the rear wall of the hopper. A portion of the rear of the sleeve 68 is cut away, as shown in Fig. 5, to reveal indicia 69 on the inner wall of the sleeve, and as the panel 67 rises inside the sleeve 68 from the position shown in Figs. 5 and 6, the panel progressively covers greater portions of the indicia 69 until when the hopper is empty the indicia are completely covered. A U-shaped guard 70 is attached to the inside of the rear wall 31 and acts as a protective shield for the indicator slot 64.

Details of the gear drive and clutch mechanism are shown in Figs. 8 and 9. As shown, the drive chain 19 from the power take-off drives a sprocket wheel 71 which in turn drives a movable pinion 72 which, with the sprocket wheel 71, are mounted on a swinging axle 73. The pinion 72 in turn can mesh with a gear 74 which drives reduction gears 76 and 77. The chain 36 which drives shaft 33 in turn is driven by a sprocket wheel 79 mounted on the same shaft as the reduction gear 77.

The speed with which the shaft 33 is rotated and the chains are advanced may conveniently be varied by changing the relative diameter and number of teeth carried by the reduction gears 76 and 77.

The pinion 72 may be raised out of mesh with the gear 74 by means of a shifter arm 81, which is operated by the lines 24 and 26. As shown in Figs. 8 and 9, the axle 73 which carries the pinion is supported for swinging by pivot arms 82. A rod 83 at the free ends of the pivot arms can rest in either of a pair of slots 84 and 86 in the head of shifter arm 81. When the lower line 26 is tightened, as shown in Fig. 8, the rod 83 is supported in shifter head slot 84 and is out of mesh, while when the upper line 24 is pulled taut, the rod 83 falls into lower shifter slot 86, and the pinion 72 and the gear 74 come into mesh to drive the distributor.

When the distributor is to be used, the chains and impeller shaft are first swung upwardly to the position indicated by dot-dash lines at A in Fig. 4. A support yoke 87 pivoted to the upper edges of the side walls of the hopper may be swung into position to hold the chains and impeller shaft in raised position while the hopper is filled. When the hopper has been filled with material 88, the yoke 87 is returned to the position shown in full lines and the distributor is allowed to rest on the material in the hopper. Then, the tractor power drive is started and the upper line 24 (Fig. 8) is tightened to permit the pinion 72 and gear 74 to mesh and drive the distributor. As shown in Fig. 4 material in the hopper is discharged through openings in the rear wall of the hopper below the shaft 33 and falls into distributor ducts 89 which may be of any desired shape or size through which the material is gravitationally distributed.

The structure including the chains, radial bars 41, gusset plates 46 and impeller shaft 42 form a rectangular frame adapted to swing about the drive shaft 33.

As the material is discharged from the hopper, the distributor frame falls gradually under the influence of gravity until it finally reaches a position indicated at B in Fig. 4 at which the contents of the hopper have been discharged and the distributor chains abut slanting baffles 91 which limit the swing of the distributor.

The impeller blades break up and distribute any aggregated particles which may form, and the chain drives cause delivery of a constant flow of particulate material to the distributor ducts 89 as long as there is material in the hopper for the impeller blades to deliver to the chains.

Since the distributor constantly takes from the top of the material in the hopper, there is no opportunity for arching of the material over the distributing device as is common in distributors which feed from the bottom of material in a hopper. Furthermore, there is no danger if material such as fertilizer which can set or harden is inadvertently left in the hopper that the fertilizer will harden about the impeller blades and the chains as no material overlies the chains or impeller shaft.

The device described above and illustrated in the drawing is subject to structural modification without departing from the spirit and scope of the appended claims.

Having described my invention what I claim as novel and desire to secure by Letters Patent is:

1. A spreader of particulate material such as seed, fertilizer and the like, adapted to be mounted on and driven by a tractor, comprising a hopper having a bottom, end and side walls, a rectangular conveyor frame disposed within the hopper and having one end thereof pivotally mounted immediately above the top of one of said end walls, a partition wall parallel to and spaced from each of the side walls, said partition walls extending from the end wall adjacent which the said frame is pivotally supported and terminating within the arc traversed by the swingable end of said frame in swinging towards and away from the bottom of said hopper, driving sprocket wheels supported on said hopper adjacent the pivotal support of said frame, one sprocket being aligned with the space between one side wall and its associated partition and the other sprocket wheel being aligned with the space between the other side wall and the partition adjacent thereto, there being a discharge opening between each of said driving sprocket wheels and the top of said one of the end walls, a sprocket wheel on each side of the swingable end of said frame disposed in alignment with the space between the respective side walls and partitions, a sprocket chain running on the pairs of sprockets at each side of said hopper, the links of said chains having scraper elements attached thereto disposed to scrape particulate material in said hopper from the top surface thereof upwardly to said discharge openings as said sprockets are driven, the conveyor frame being unobstructed below said scraper elements, whereby the material in the hopper is drawn to the discharge openings by the chains and discharged therethrough, and means for receiving the discharged material and spreading the same along the ground as the hopper is transported.

2. In a device for distributing particulate material, the combination of a substantially rectangular hopper having a bottom, side, and end walls, a horizontal shaft rotatably mounted in the side walls of said hopper above said bottom and immediately above and parallel to one of the end walls of said hopper, means for rotating said shaft, a pair of vertical partition walls in said hopper parallel to said side walls extending from said end wall partly across the hopper, each of said partition walls being adjacent and closely spaced from one of said side walls to form a pair of narrow elongated vertically walled spaces adjacent the side walls of the hopper opening into the hopper at the end away from the shaft, there being a discharge opening between each partition wall and its associated side wall, each discharge opening being between the shaft and the end wall therebelow, a pair of sprocket wheels mounted on and secured to said shaft, each of said sprocket wheels being aligned with one of the spaces, a sleeve rotatably mounted about said shaft and extending between the sprocket wheels, a pair of bars attached to said sleeve and extending radially thereof across the hopper in said spaces, said bars being parallel, a second shaft, said second shaft being rotatably mounted at the free ends of the bars beyond the ends of said partition walls, a pair of sprocket wheels mounted on and secured to said second shaft, each of the sprocket wheels on the second shaft being in alignment with one of the sprocket wheels on the first mentioned shaft, a pair of endless chains, each of said endless chains running on one of the sprocket wheels on the second shaft and the sprocket wheel on the first shaft in alignment therewith and having an upper reach and a lower reach, said chains running in said spaces, a plurality of scraper blades attached to each chain and adapted to scrape material in the hopper toward said end wall to be discharged through the discharge openings, and impeller blades on said second shaft adapted to impel material in the hopper toward the side walls thereof as the shafts and sprocket wheels are rotated in a direction to advance the lower courses of the chains toward said end wall, said bars, chains and impeller bladed shaft forming a framework adapted to swing downwardly about the first mentioned shaft as material in the hopper is removed, said framework being unobstructed below the lower courses of the chains.

3. A device for distributing granular material in accordance with claim 2 characterized by the fact that a flat retarder bar extends between the bars and is adapted to rest on top of material in the hopper in flatwise relation therewith to restrain descent of the chains and the impeller bladed shaft.

4. In a device for distributing particulate material, the combination of a substantially rectangular hopper having a bottom, side and end walls, a horizontal shaft rotatably mounted in the side walls of said hopper immediately above and parallel to the top of one of the end walls of said hopper, means for rotating said shaft, a pair of sprocket wheels mounted on and secured to said shaft, each of said sprocket wheels being mounted between said side walls adjacent and closely spaced from one of said side walls, there being a discharge opening between each of said sprocket wheels and said one of the end walls of the hopper, a sleeve rotatably mounted about said shaft and extending between the sprocket wheels, a pair of bars attached to said sleeve and extending radially thereof across the hopper, said bars being parallel, each of said bars extending substantially in alignment with one of the sprocket wheels, a second shaft, said second shaft being rotatably mounted at the swingable ends of the bars, a pair of sprocket wheels mounted on and secured to said second shaft, each of the sprocket wheels on said second shaft being in alignment with one of the sprocket wheels on the first mentioned shaft, a pair of endless chains, each of said chains running on one of the sprocket wheels on the first mentioned shaft and the sprocket wheel on the second shaft in alignment therewith and having an upper course and a lower course, a plurality of scraper blades attached to each chain and adapted to scrape material in the hopper toward said discharge openings to be discharged therethrough, and impeller blades on said second shaft adapted to impel material in the hopper toward the side walls thereof as the shafts and sprocket wheels are rotated in a direction to advance the lower courses of the chains toward said end wall, said bars, chains, and impeller blade shaft forming a framework adapted to swing downwardly about the first mentioned shaft as material in the hopper is removed, said framework being unobstructed below the lower courses of the chains.

5. A spreader of particulate material such as seed, fertilizer and the like, adapted to be mounted on and driven by a tractor, comprising a hopper having a bottom, end and side walls, a rectangular conveyor frame disposed within the hopper and having one end thereof pivotally mounted immediately above the top of one of said end walls, a partition wall parallel to and spaced from each of the side walls, said partition walls extending from the end wall adjacent which the said frame is pivotally supported and terminating within the arc traversed by the swingable end of said frame while swinging towards and away from the bottom of said hopper, driving sprocket wheels supported on said hopper and rotatably mounted on the pivotal support of said frame, one sprocket being aligned with the space between each side wall and its associated partition, there being a discharge opening between each driving sprocket wheel and said one of the end walls, a sprocket wheel on each side of the swingable end of said frame disposed in alignment with the space between the respective side walls and partitions, a sprocket chain running on the pairs of sprockets at each side of said hopper, the links of said chains having scraper elements attached thereto disposed to scrape particulate material in said hopper from the top surface thereof as said sprockets are driven, said frame being unobstructed below the lower courses of the chains, whereby the chains engage the material in the hopper throughout the lower courses thereof and scrape the material to the discharge openings to be discharged therethrough, a screw feeder mounted on the swingable end of said frame, means connecting the screw feeder to the sprocket wheels at the swingable end of the frame for driving the feeder, said feeder having two sections in which the screw flights are of opposite hand, whereby particulate material between said partition walls is fed toward and in the space between the respective partitions and side walls and into the path of said scrapers, and means for receiving the discharged material from the discharge openings and spreading the same along the ground as the hopper is transported.

6. A device for distributing particulate material which comprises a hopper having an end wall, a shaft rotatably mounted immediately above the top of said end wall and parallel thereto, there being a discharge opening between said shaft and said end wall, a bar extending radially of said shaft and pivotally mounted thereon, a driving sprocket wheel mounted on said shaft to turn in said discharge opening, a driven sprocket wheel rotatably mounted at the swingable end of the bar, an endless chain running on said sprocket wheels, a plurality of scraper blades attached to said chain, and means for rotating said shaft and driven sprocket in a direction to advance the lower course of said chain toward the discharge opening to scrape the top layer of the material in the hopper upwardly to the discharge opening to be discharged therethrough, the bar and chain forming a framework swinging downwardly through the hopper as material is discharged therefrom, said framework being unobstructed below the lower course of the chain, whereby the scraper blades of the chain engage the material in the hopper throughout the lower course of the chain.

WALLACE B. HURLBURT.

REFERENCES CITED

The following references are of record in the file of this patent:

UNITED STATES PATENTS

| Number | Name | Date |
|---|---|---|
| 897,942 | Wangelin | Sept. 8, 1908 |
| 2,298,332 | Applegate | Oct. 13, 1942 |
| 2,410,012 | Churchman | Oct. 29, 1946 |
| 2,517,300 | Giese | Aug. 1, 1950 |

FOREIGN PATENTS

| Number | Country | Date |
|---|---|---|
| 485,957 | Great Britain | May 27, 1937 |